(12) United States Patent
Barnett et al.

(10) Patent No.: US 7,660,598 B2
(45) Date of Patent: Feb. 9, 2010

(54) TRANSMIT POWER REDUCTION FOR A WIRELESS DEVICE WITH MULTIPLE TRANSMIT SIGNAL PATHS

(75) Inventors: Kenneth Charles Barnett, Oceanside, CA (US); Charles J. Persico, Rancho Santa Fe, CA (US); Paul Peterzell, Plantation, FL (US)

(73) Assignee: QUALCOMM, Incorporated, San Diego, CA (US)

( * ) Notice: Subject to any disclaimer, the term of this patent is extended or adjusted under 35 U.S.C. 154(b) by 645 days.

(21) Appl. No.: 11/020,054

(22) Filed: Dec. 21, 2004

(65) Prior Publication Data

US 2006/0135079 A1 Jun. 22, 2006

(51) Int. Cl.
*H04B 7/00* (2006.01)

(52) U.S. Cl. ........................ 455/522; 455/69; 455/67.13

(58) Field of Classification Search ................. 455/522, 455/69, 101, 81, 287, 103, 105, 63.1, 67.13, 455/62, 313, 522.1, 127.3, 127.4, 550.1, 455/442, 135; 370/334, 329; 375/344, 299, 375/146, 229, 267, 298
See application file for complete search history.

(56) References Cited

U.S. PATENT DOCUMENTS

| | | | | |
|---|---|---|---|---|
| 5,164,942 | A * | 11/1992 | Kamerman et al. | 370/334 |
| 5,570,349 | A * | 10/1996 | Bustamante et al. | 370/335 |
| 5,584,057 | A * | 12/1996 | Dent | 455/101 |
| 5,768,691 | A * | 6/1998 | Matero et al. | 455/78 |
| 6,473,600 | B1 * | 10/2002 | Dvorkin | 455/129 |
| 6,757,267 | B1 * | 6/2004 | Evans et al. | 370/334 |
| 7,069,060 | B2 * | 6/2006 | Kimata et al. | 455/574 |
| 7,155,251 | B2 * | 12/2006 | Saruwatari et al. | 455/552.1 |
| 7,330,698 | B1 * | 2/2008 | Bolt et al. | 455/63.1 |
| 7,333,455 | B1 * | 2/2008 | Bolt et al. | 370/334 |
| 2002/0012333 | A1 | 1/2002 | Yoshida et al. | |

(Continued)

FOREIGN PATENT DOCUMENTS

EP 1416647 5/2004

(Continued)

OTHER PUBLICATIONS

Katz, M., et al. (2001) Combining Space-Time Block Coding with Diversity Antenna Selection for Improved Downlink Performance. IEEE, XP 10562669A, pp. 178-182.

*Primary Examiner*—Tan Trinh
(74) *Attorney, Agent, or Firm*—Timothy F. Loomis; Ramin Mobarhan

(57) ABSTRACT

A wireless device is equipped with multiple (e.g., two) antennas, which may be of different designs. Each antenna interacts with the wireless environment in a different manner and achieves different scattering effect. The wireless device has one transmit signal path for each antenna. Each transmit signal path generates an RF output signal for transmission from the associated antenna. The wireless device controls the operation of one or more transmit signal paths to achieve a larger received signal level at a receiving base station. The wireless device may (1) autonomously adjust the transmit signal path(s) without relying on any feedback from the base station or (2) adjust the transmit signal path(s) based on transmit power control (TPC) commands received from the base station. The wireless device may selectively enable and disable each transmit signal path, vary the phase and/or gain of each transmit signal path, and so on.

36 Claims, 7 Drawing Sheets

U.S. PATENT DOCUMENTS

| | | |
|---|---|---|
| 2002/0118783 A1 | 8/2002 | Cripps et al. |
| 2003/0002594 A1* | 1/2003 | Harel et al. .................. 375/299 |
| 2003/0045333 A1* | 3/2003 | Kimata et al. ............... 455/574 |
| 2004/0092235 A1* | 5/2004 | Li et al. ...................... 455/101 |
| 2004/0196930 A1* | 10/2004 | Molnar ....................... 375/344 |
| 2004/0235433 A1* | 11/2004 | Hugl et al. .................. 455/101 |
| 2004/0253955 A1* | 12/2004 | Love et al. .................. 455/442 |
| 2005/0064825 A1* | 3/2005 | Forrester .................... 455/101 |
| 2005/0245280 A1* | 11/2005 | Liu et al. ..................... 455/522 |
| 2007/0099585 A1* | 5/2007 | Trachewsky et al. ..... 455/127.4 |
| 2007/0117523 A1* | 5/2007 | Weber et al. .................. 455/81 |

FOREIGN PATENT DOCUMENTS

| | | |
|---|---|---|
| GB | 2353437 | 2/2001 |
| GB | 2376843 | 12/2002 |
| WO | 2004015887 | 2/2004 |

\* cited by examiner

TRANSMIT POWER REDUCTION FOR A WIRELESS DEVICE WITH MULTIPLE TRANSMIT SIGNAL PATHS

BACKGROUND

I. Field

The present invention relates generally to communication, and more specifically to techniques for transmitting data by a wireless device.

II. Background

In a wireless communication system, a radio frequency (RF) signal transmitted by a wireless device (e.g., a cellular phone) may reach a base station via multiple signal paths. These signal paths may include a line-of-sight path and reflected paths, which are created by reflections of radio waves in the environment. The base station may thus receive multiple instances of the transmitted RF signal. Each received signal instance is obtained via a different signal path and has a complex gain and a propagation delay determined by that signal path. The received signal instances may add constructively at the base station and produce a received signal having a larger magnitude. Conversely, the received signal instances may add destructively and produce a received signal having a smaller magnitude. Different received signal levels may thus be obtained depending on reinforcement or cancellation of the received signal instances. Reinforcement is usually not problematic. However, cancellation may cause the received signal level to drop by a large amount, e.g., by up to 40 decibels (dB). The received signal is said to be in a "fade" when attenuated by a large amount due to cancellation.

Some wireless communication systems, such as Code Division Multiple Access (CDMA) systems, utilize power control to mitigate the deleterious effects of fading. With power control, the transmit power of the wireless device is adjusted either up or down as needed to achieve a target signal-to-total-noise ratio (SNR) at the base station. If the base station detects that the received SNR for the wireless device drops below the target SNR, e.g., due to changes in the wireless environment, then the base station sends transmit power control (TPC) commands to direct the wireless device to increase its transmit power. The wireless device may vary its transmit power over a wide range in order to maintain the received SNR at or near the target SNR. For example, if a fade causes the received signal at the base station to drop by 20 dB, then the wireless device would be instructed to increase its transmit power by approximately 20 dB (or 100 times higher) in order to maintain the desired SNR at the base station.

Many wireless devices are portable and powered by internal batteries. The use of high transmit power to combat fading depletes battery power, which shortens talk time. There is therefore a need in the art for techniques to reduce transmit power and extend talk time for such a portable wireless device.

SUMMARY

A wireless device equipped with multiple (e.g., two) antennas and capable of transmitting in a manner to reduce transmit power on average is described herein. Each antenna interacts with the wireless environment in a different manner and is used to provide diversity. The multiple antennas may be of different designs/types (e.g., a dipole antenna and a patch antenna) to achieve different scattering effects. The wireless device also has one transmit signal path for each antenna. Each transmit signal path generates an RF output signal for transmission from the associated antenna. The RF output signals for the multiple antennas may have the same or different signal levels.

The wireless device controls the operation of one or more designated transmit signal paths to achieve a larger received signal level at a receiving base station. The control of the designated transmit signal path(s) is in addition to the gain or transmit power adjustment that is normally performed by the wireless device in response to TPC commands received from the base station for power control. For example, the wireless device may autonomously control the designated transmit signal path(s) without relying on any feedback from the base station. The wireless device may also control the designated transmit signal path(s) based on the received TPC commands. For both autonomous and feedback-based control, the wireless device may selectively enable and disable each transmit signal path, vary the phase and/or gain of each transmit signal path, and so on. In any case, the larger received signal level at the base station due to the varied operation of the designated transmit signal path(s) allows the wireless device to transmit at a lower transmit power level on average, which then reduces power consumption and extends talk time for the wireless device.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
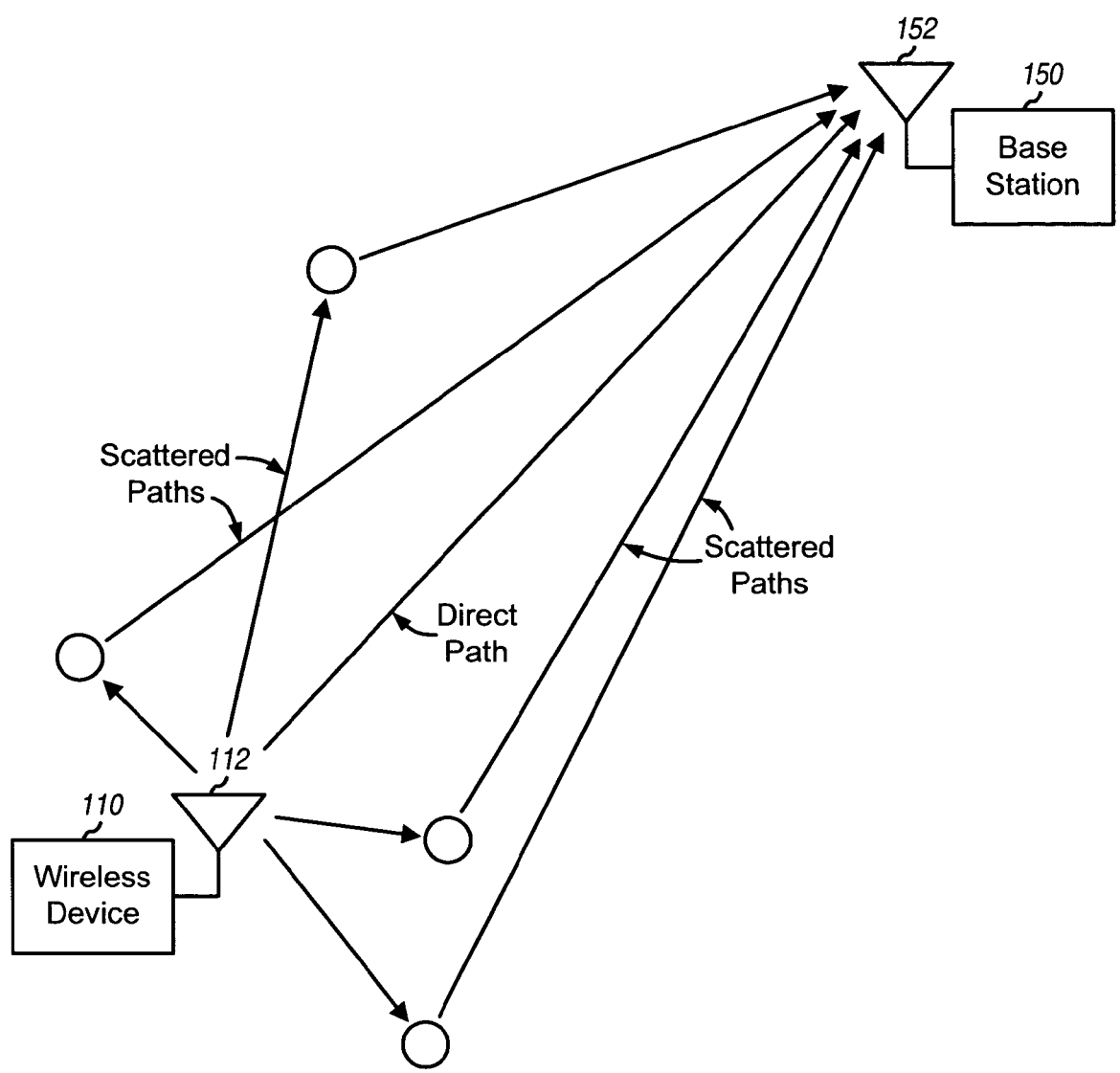
FIG. 1 shows scattering effect on a signal transmission.

FIG. 1 shows the effect of scattering on a signal transmission from a single transmit antenna 112 at a wireless device 110 to a single receive antenna 152 at a base station 150. Scattering refers to the interaction between the transmit antenna and the wireless environment (or radio channel). The scattering results in an RF output signal sent from the transmit antenna being received via reflected (or scattered) paths as well as possibly line-of-sight (or direct) path. The multiple received signal instances for the different signal paths may add constructively or destructively at the receive antenna. The received signal may be larger if the received signal instances reinforce one another or attenuated if the received signal instances cancel one another, depending on the path lengths and signal phase upon arrival. The interaction between the transmit antenna and the wireless environment determines the set of signal paths for the transmitted RF signal and hence the received signal strength at the receive antenna.

Different transmit antennas may be used for transmit antenna 112 and these different transmit antennas would generally experience different scattering effects in the same wireless environment. The transmit antennas may be considered to be "different" if they are of different antenna designs or types and/or have different beam patterns, different locations, different polarizations, and/or some other different characteristics. In general, transmit antennas that are more different from one another tend to experience more different scattering effects. Transmit antennas are considered to be de-correlated (i.e., uncorrelated) or having low correlation if they interact with the wireless environment in significantly different ways.

The received signal at the base station has a signal level that is determined by the transmit antenna used for transmission and the wireless environment. The base station may obtain a different received signal level for each different transmit antenna used for transmission in the same wireless environment due to the different scattering effect achieved by the transmit antenna. Different received power levels obtained by the base station for different individual transmit antennas are de-correlated if these transmit antennas are de-correlated and the wireless environment produces sufficient scattering due to path delay.

The above description assumes the use of one transmit antenna 112 for data transmission. To improve performance, multiple transmit antennas may be used to create multiple different and preferably de-correlated sets of received signal instances at the base station, one set for each transmit antenna. The multiple transmit antennas may be selectively enabled and disabled and/or the signals sent from these transmit antennas may be adjusted in amplitude and/or phase such that all of the received signal instances at the base station combine to produce a larger received signal. The different interactions between the different transmit antennas and the wireless environment (and hence different scattering effects) are relied upon to improve the received signal level. This is in contrast to conventional beamforming which attempts to form an antenna beam and steer a signal transmission toward the receive antenna.

In the following description, a "channel configuration" refers to a given set of one or more transmit antennas operating in a given wireless environment. Different channel configurations may be obtained with different individual antennas, different combinations of antennas, different adjustments of the signals sent from multiple antennas, and so on. A "transmit signal path" refers to a collection of circuit blocks used to generate an RF output signal (RFout) for one antenna. One transmit signal path is provided for each antenna. However, multiple transmit signal paths may share some common circuit blocks. Each transmit signal path generally covers all of the signal processing/conditioning from analog baseband to RF.

Figure 2:
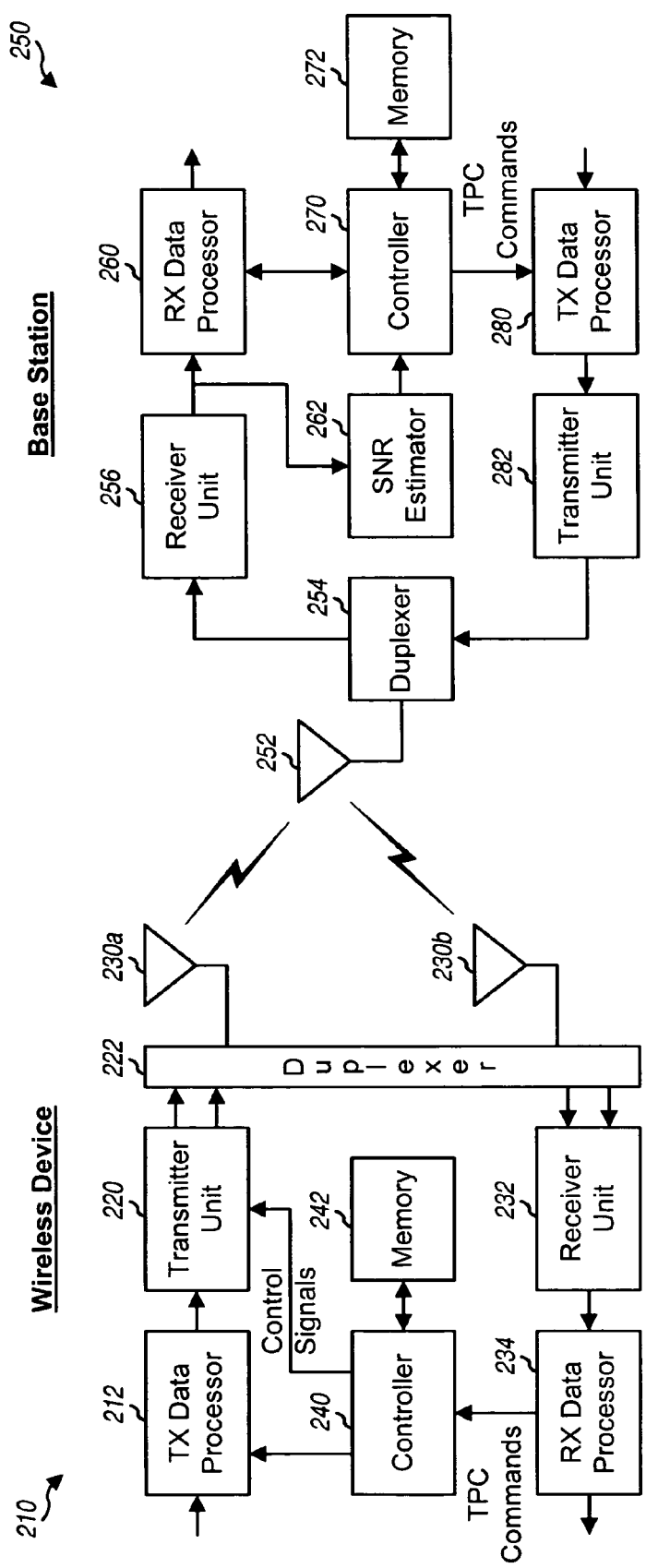
FIG. 2 shows a block diagram of a wireless device and a base station.

FIG. 2 shows a block diagram of an embodiment of a wireless device 210 and a base station 250. For this embodiment, wireless device 210 is equipped with two antennas 230a and 230b, and base station 250 is equipped with a single antenna 252. In general, wireless device 210 may be equipped with any number of antennas, and base station 250 may also be equipped with any number of antennas.

On the reverse link (or uplink), a transmit (TX) data processor 212 receives and processes traffic data and generates one or more streams of data chips. The processing by TX data processor 212 is system dependent and may include, e.g., encoding, interleaving, symbol mapping, and so on. For a CDMA system, the processing typically further includes channelization and spectral spreading. TX data processor 212 also converts each stream of data chips into a corresponding analog baseband signal. A transmitter unit 220 receives and conditions (e.g., amplifies, filters, and frequency upconverts) the baseband signals from TX data processor 212 and generates an RF output signal for each antenna used for data transmission. The RF output signals are routed through a duplexer unit 222 and transmitted via antennas 230a and 230b.

At base station 250, the RF signals transmitted by wireless device 210 are received by antenna 252, routed through a duplexer 254, and provided to a receiver unit 256. Receiver unit 256 conditions (e.g., filters, amplifies, and frequency downconverts) the received signal, digitizes the conditioned signal, and provides a stream of data samples. A receive (RX) data processor 260 processes the data samples and provides decoded data. The processing by RX data processor 260 is complementary to the processing by TX data processor 212 and may include, e.g., despreading, de-channelization, symbol demapping, deinterleaving, and decoding.

For power control of wireless device 210, an SNR estimator 262 estimates the received SNR for wireless device 210, e.g., based on a pilot transmitted by the wireless device. A controller 270 compares the received SNR against a target SNR for wireless device 210 and generates TPC commands based on the result of the comparison. Each TPC command may be either an UP command to direct wireless device 210 to increase its transmit power (e.g., by a predetermined amount) or a DOWN command to direct wireless device 210 to decrease its transmit power. Controller 270 typically adjusts the target SNR to achieve a target packet/frame error rate for wireless device 210. The TPC commands for wireless device 210 as well as other data are processed by a TX data processor 280, conditioned by a transmitter unit 282, routed through duplexer 254, and transmitted via antenna 252.

At wireless device 210, the RF signal transmitted by base station 250 is received by antennas 230a and 230b, routed through duplexer unit 222, conditioned and digitized by a receiver unit 232, and processed by an RX data processor 234 to recover the TPC commands sent by base station 250 for wireless device 210. A controller 240 receives the TPC commands and controls the processing by TX data processor 212 and the operation of transmitter unit 220. For example, controller 240 may generate control signals that vary the operation of transmitter unit 220 for transmission on the reverse link. The control signals may be generated (1) based on the received TPC commands and/or some other feedback from base station 250 or (2) autonomously by wireless device 210 without any feedback, as described below.

Controllers 240 and 270 also direct the operation of various processing units within wireless device 210 and base station 250, respectively. Memory units 242 and 272 store data and program codes for controllers 240 and 270, respectively.

The TPC commands represent one form of feedback that is readily available at wireless device 210 and which may be used to deduce the current channel condition. Wireless device 210 may detect a fade if a high percentage of UP commands are received from base station 250. However, other forms of feedback from base station 250 may also be used to deduce the current channel condition.

At wireless device 210, antenna 230a may be considered as the main antenna, and antenna 230b may be considered as the secondary or diversity antenna. Antennas 230a and 230b may be implemented with the same or different antenna designs. If antennas 230a and 230b are of the same design/type, then different scattering effects may be achieved by placing these antennas at different locations and/or with different orientations. However, improved performance may be achieved if antennas 230a and 230b are of different designs/types and have different antenna patterns, different polarizations, and/or some other different characteristics.

For example, antenna 230a may be implemented as a dipole antenna, and antenna 230b may be implemented as a patch antenna. A dipole antenna is also called a whip antenna, and a common example is a pullout antenna often used for cellular phones. An exemplary design of a dipole antenna is described in U.S. Pat. No. 6,239,755, entitled "Balanced, Retractable Mobile Phone Antenna," issued May 29, 2001. A patch antenna is also called a planar antenna and is typically fabricated on a printed circuit board. An exemplary design of a patch antenna is described in U.S. Pat. No. 6,559,809, entitled "Planar Antenna for Wireless Communications," issued May 6, 2003. An exemplary antenna assembly with two different types of antennas (a sleeve dipole antenna and a quadrifilar helix antenna) is described in U.S. Pat. No. 6,720,929, entitled "Compact Dual Mode Integrated Antenna System for Terrestrial Cellular and Satellite Telecommunications," issued Apr. 13, 2004. Other types of antenna may also be used for antennas 230a and 230b. For example, antennas 230a and 230b may be implemented with flat coils, patches, microstrip antennas, stripline antennas, printed dipoles, inverted F antennas (which are special cases of patch antennas), planar inverted F antennas (PIFA), polarized patches, plate antennas (which are irregularly shaped, flat antennas with no ground plane), and so on.

Figure 3:
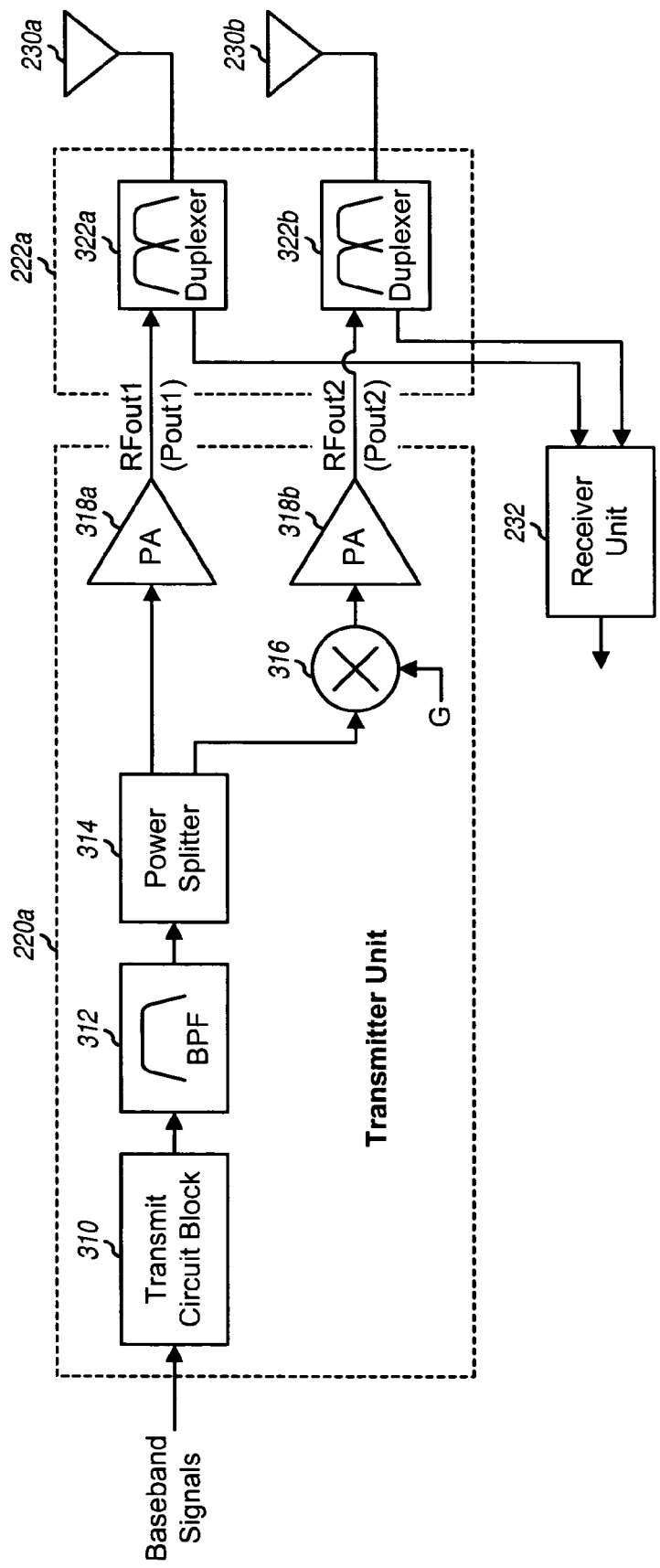
FIG. 3 shows an embodiment of a transmitter unit at the wireless device.

FIG. 3 shows a block diagram of a transmitter unit 220a, which is an embodiment of transmitter unit 220 in FIG. 2. Within transmitter unit 220a, a transmit circuit block 310 receives the baseband signals and generates a modulated signal. Transmit circuit block 310 typically includes amplifiers, mixers, filters, and so on, and may be implemented within an RF integrated circuit (RFIC) and/or with discrete circuit components. A bandpass filter (BPF) 312 filters the modulated signal and provides a filtered modulated signal. A power splitter 314 splits the filtered modulated signal, provides a first RF modulated signal to a power amplifier (PA) 318a, and provides a second RF modulated signal to a circuit element 316. Power splitter 314 may be implemented with a coupler or some other type of circuit. The first and second RF modulated signals may have the same or different signal levels. For example, the second RF modulated signal may be smaller than the first RF modulated signal by 3 dB, 6 dB, 10 dB, or some other amount.

Circuit element 316 multiplies the second RF modulated signal with a complex gain G and provides a scaled RF modulated signal to a power amplifier 318b. Circuit element 316 may scale the amplitude and/or rotate the phase of the second RF modulated signal to generate the scaled RF modulated signal. Power amplifier 318a amplifies the first RF modulated signal and provides a first RF output signal (RFout1), which is routed through a duplexer 322a and transmitted from antenna 230a. Similarly, power amplifier 318b amplifies the scaled RF modulated signal and provides a second RF output signal (RFout2), which is routed through a duplexer 322b and transmitted from antenna 230b. Power amplifiers 318a and 318b may have the same or different gains. For example, power amplifier 318a may be designed to provide more gain and higher RF output signal level than power amplifier 318b (e.g., 25 dB gain for power amplifier 318a versus 15 dB gain for power amplifier 318b). The RF output signal level from power amplifier 318a is Pout1 and the RF output signal level from power amplifier 318b is Pout2, where Pout1 may or may not be equal to Pout2.

The main transmit signal path includes all of the circuit blocks from transmit circuit block 310 up to antenna 230a, including power amplifier 318a and duplexer 322a. The diversity transmit signal path includes all of the circuit blocks from transmit circuit block 310 up to antenna 230b, including circuit element 316, power amplifier 318b, and duplexer 322b. Transmit circuit block 310, bandpass filter 312, and power splitter 314 are common to and shared by both the main and diversity transmit signal paths. The main transmit signal path may be designed to be compliant with applicable system requirements such as, e.g., power and linearity requirements imposed by the IS-98 standard for CDMA. The diversity transmit signal path may or may not be compliant with all of the system requirements. For example, the diversity transmit signal path may be designed to meet all IS-98 specifications except for the maximum output power requirement of +23 dBm (e.g., the diversity transmit signal path may provide a maximum output power of only +12 dBm). If the diversity transmit signal path is not fully spec-compliant and/or if the second RF output signal level is smaller than the first RF output signal level, then power amplifier 318b may not need to have the same power and linearity performance as power amplifier 318a. In this case, power amplifier 318b may be designed with fewer amplifier stages and/or to consume less power and have lower cost. It may also be possible to omit power amplifier 418b from the diversity transmit signal path. Duplexer 322b may also have relaxed requirements.

Antenna 230a may be of a first type (e.g., a dipole antenna) and antenna 230b may be of a second type (e.g., a patch antenna), as described above. If antennas 230a and 230b are de-correlated, then when the channel for one of the antennas is faded, the channel for the other antenna may not be faded. By adjusting the relative phase and/or amplitude of the two RF output signals, a larger received signal may be obtained by base station 250 with the same or lower transmit power from wireless device 210. Circuit element 316 is used to adjust the complex gain (i.e., phase and/or amplitude) of the second RF output signal transmitted from diversity antenna 230b and may be implemented with a multiplier, a programmable delay element, or some other type of circuit. The adjustment of the complex gain for the diversity transmit signal path may be performed in various manners.

In one embodiment, wireless device 210 autonomously adjusts the complex gain for the second transmit signal path without any feedback from base station 250. In a first adjustment scheme, wireless device 210 systematically sweeps the phase of the second RF output signal. This may be achieved by multiplying the second RF modulated signal from power splitter 314 with a complex gain of $e^{j2\pi \cdot n/N}$ for each time interval n. The duration of each time interval may be defined to be shorter than the expected duration of a fast fade, so that that the second RF output signal can be adjusted through the fade. The entire 360° is swept over N time intervals, where N may be any value greater than one. In a second adjustment scheme, the second RF modulated signal is multiplied with a pseudo-random phase of $e^{j2\pi \cdot p(n)/N}$ for each time interval n, where p(n) is a pseudo-random value between 0 and N, i.e., $0 \leq p(n) < N$. In a third adjustment scheme, the diversity transmit signal path is cycled between an ON state (enabled) and an OFF state (disabled) by alternately multiplying the second RF modulated signal with gains of G=1 and G=0, respectively. The second RF modulated signal may also be multiplied with some other complex values that may be systematically or pseudo-randomly selected.

In another embodiment, wireless device 210 adjusts the complex gain for the diversity transmit signal path based on feedback from base station 250. This feedback may be in the form of the TPC commands sent by base station 250 for power control of wireless device 210. Wireless device 210 may detect for a drop in the received signal level at base station 250 based on the received TPC commands. For example, wireless device 210 may deduce that the current channel configuration is in a fade if a predetermined number of consecutive UP commands is received from base station 250, if a predetermined percentage (or higher) of TPC commands received within a certain time window is UP commands, and so on. Wireless device 210 may then adjust the complex gain for the second transmit signal path whenever a fade is detected based on the received TPC commands. If antennas 230a and 230b are de-correlated, then there is good probability that the new channel configuration will be better than the prior channel configuration. Wireless device 210 may continue to adjust the complex gain until the distribution of TPC commands is deemed to be back to normal. Wireless device 210 may adjust the complex gain at a rate that is slower than the TPC command rate to give each complex gain setting sufficient time to take effect.

Figure 4:
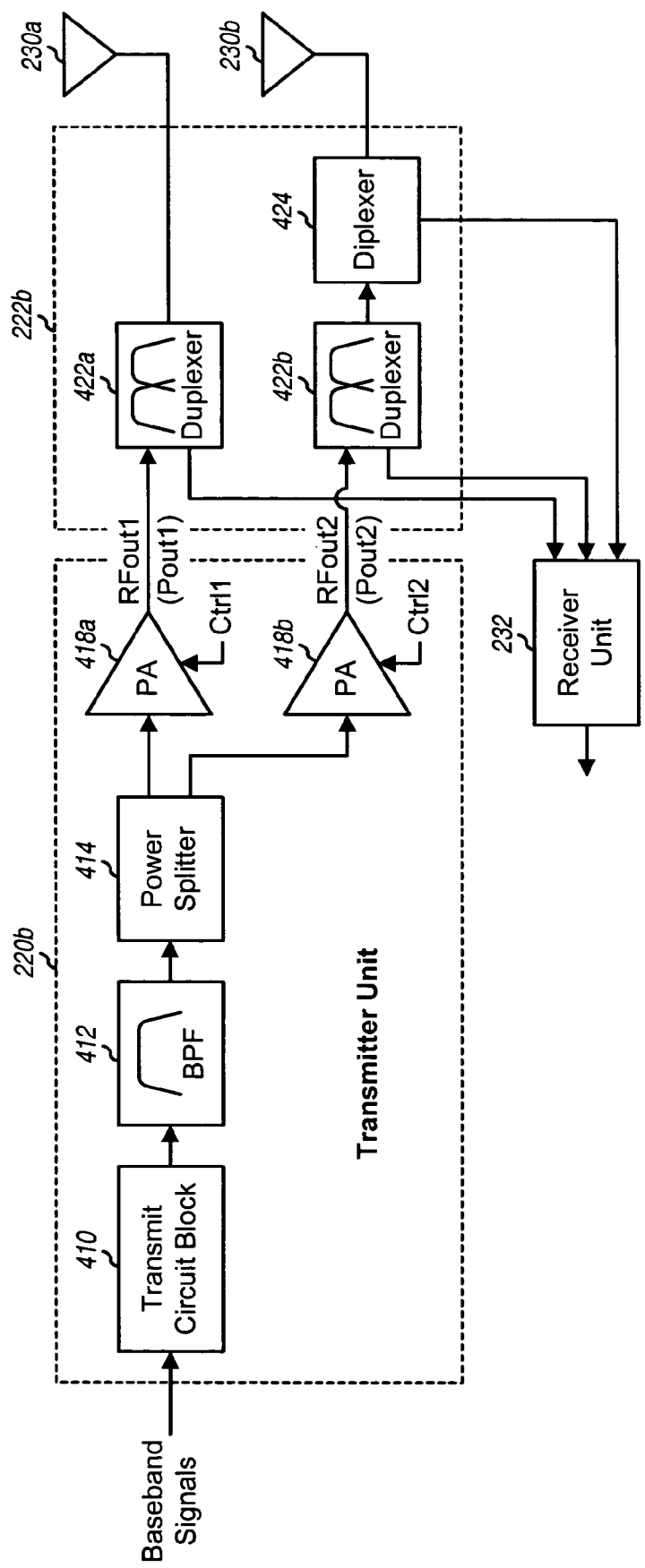
FIG. 4 shows another embodiment of the transmitter unit.

FIG. 4 shows a block diagram of a transmitter unit 220b, which is another embodiment of transmitter unit 220 in FIG. 2. Within transmitter unit 220b, a transmit circuit block 410, a bandpass filter 412, and a power splitter 414 process the baseband signals as described above for FIG. 3 and provide first and second RF modulated signals to power amplifiers 418a and 418b, respectively. Power amplifier 418a amplifies the first RF modulated signal and provides the first RF output signal, which is routed through a duplexer 422a and transmitted from antenna 230a. Similarly, power amplifier 418b amplifies the second RF modulated signal and provides the second RF output signal, which is routed through a duplexer 422b and a diplexer 424 and transmitted from antenna 230b. The first RF output signal level is Pout1 and the second RF output signal level is Pout2. The first and second RF output signals may have the same or different signal levels. For example, the second RF output signal may have a lower signal level than the first RF output signal. The lower level for the second RF output signal may be obtained by (1) generating the second RF modulated signal to be smaller than the first RF modulated signal and/or (2) using a lower gain for power amplifier 418b than for power amplifier 418a.

Power amplifier 418a and duplexer 422a are part of the main transmit signal path. Power amplifier 418b, duplexer 422b, and diplexer 424 are part of the diversity transmit signal path. A first control signal (Ctrl1) is provided to power amplifier 418a and used to control the operation of power amplifier 418a. A second control signal (Ctrl2) is provided to power amplifier 418b and used to control the operation of power amplifier 418b. Each control signal may selectively enable or disable the associated power amplifier, adjust the phase and/or gain of the associated power amplifier, and/or adjust the operation of the associated power amplifier in some other manner. Each control signal may be generated based on the TPC commands received from base station 250. However, the Ctrl1 and Ctrl2 signals may be generated in different manners, as described below. Wireless device 210 may control the main and diversity transmit signal paths in various manners.

In an embodiment, the main transmit signal path is enabled whenever wireless device 210 is transmitting, and the diversity transmit signal path is selectively enabled and disabled based on feedback from base station 250. For this embodiment, the Ctrl1 signal is used to adjust the transmit power level of the first RF output signal from power amplifier 418a. The Ctrl1 signal may be generated in the normal manner based on the TPC commands received from base station 250 and may (1) increase the gain of power amplifier 418a by a predetermined amount for each UP command and (2) decrease the gain of power amplifier 418a by a predetermined amount for each DOWN command. The Ctrl2 signal may also be generated based on the received TPC commands to achieve good performance at base station 250. In a first adjustment scheme, the Ctrl2 signal toggles power amplifier 418b between the ON state (enabled) and the OFF state (disabled) whenever a fade is detected based on the received TPC commands. A fade may be detected as described above for FIG. 3. Different channel configurations, and hence different received signal levels at the base station, are obtained with the diversity transmit signal path enabled and disabled. In a second adjustment scheme, the Ctrl2 signal enables power amplifier 418b if a fade is detected and disables power amplifier 418b if good channel condition is detected. Good channel condition may be detected, e.g., if a predetermined number of consecutive DOWN commands is received from base station 250, if a predetermined percentage (or higher) of TPC commands received within a certain time window is DOWN commands, and so on.

In another embodiment, wireless device 210 cycles through the main and diversity transmit signal paths based on feedback from base station 250. Wireless device 210 may initially enable the main transmit signal path for transmission on the reverse link. Wireless device 210 may then enable both the main and diversity transmit signal paths if a fade is detected, then enable just the diversity transmit signal path if another fade is detected, then enable just the main transmit signal path if another fade is detected, and so on. For this embodiment, each detected fade results in a different channel configuration being selected for transmission. The main and diversity transmit signal paths may be enabled and disabled in a predetermined order (e.g., as described above) or in a pseudo-random manner.

As noted above, the second RF output signal for the diversity transmit signal path may be lower in amplitude than the first RF output signal for the main transmit signal path. If a fade causes the received signal level at the base station to drop by 20 dB, then performance may be improved even if the second RF output signal is 3 dB, 6 dB, or even 10 dB lower than the first RF output signal. Furthermore, the actual transmit power level used by the wireless device is often lower than the maximum transmit power specified by the system. For example, although IS-98 specifies a maximum transmit power level of 23 dBm at the antenna, the actual transmit power level used by the wireless device is often between a nominal range of 5 dBm and 10 dBm for most operating scenarios. The actual transmit power level is rarely at the maximum or minimum power level specified by the system and, instead, is within the nominal range for much of the time. These operating characteristics may be exploited to simplify the implementation of the transmitter unit at the wireless device.

Figure 5:
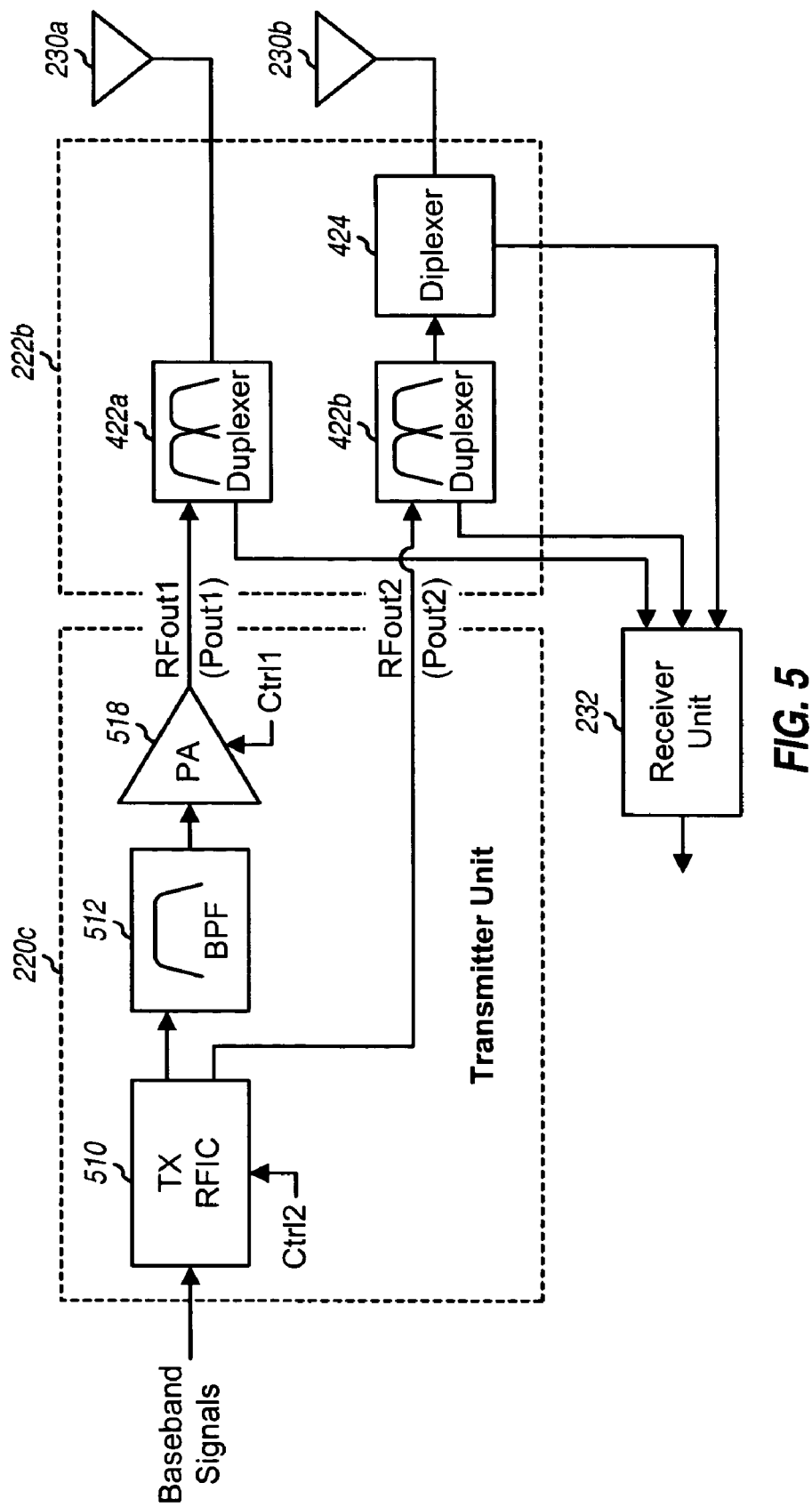
FIG. 5 shows yet another embodiment the transmitter unit.

FIG. 5 shows a block diagram of a transmitter unit 220c, which is yet another embodiment of transmitter unit 220 in FIG. 2. Within transmitter unit 220c, a transmit RF integrated circuit (TX RFIC) 510 receives and processes the baseband signals and provides the first and second RF modulated signals. A bandpass filter 512 filters the first RF modulated signal and provides a filtered modulated signal. A power amplifier 518 amplifies the filtered modulated signal and provides the first RF output signal to duplexer 422a. The second RF modulated signal is used as the second RF output signal and is provided directly to duplexer 422b. The first RF output signal level is Pout1 and the second RF output signal level is Pout2, where Pout1 is typically higher than Pout2 due to power amplifier 518.

The Ctrl1 signal is provided to power amplifier 518 and used to control the operation of power amplifier 518 for the main transmit signal path. The Ctrl2 signal is provided to TX RFIC 510 and used to control the operation of TX RFIC 510 for the diversity transmit signal path. Each control signal may selectively enable or disable the associated transmit signal path, adjust the phase and/or gain of the associated transmit signal path, and/or alter the operation of any circuit element within the associated transmit signal path. Each control signal may be generated based on the TPC commands received from base station 250, and the Ctrl1 and Ctrl2 signals may be generated in different manners. Wireless device 210 may control the main and diversity transmit signal paths in various manners, as described above for FIGS. 3 and 4.

Figure 6:
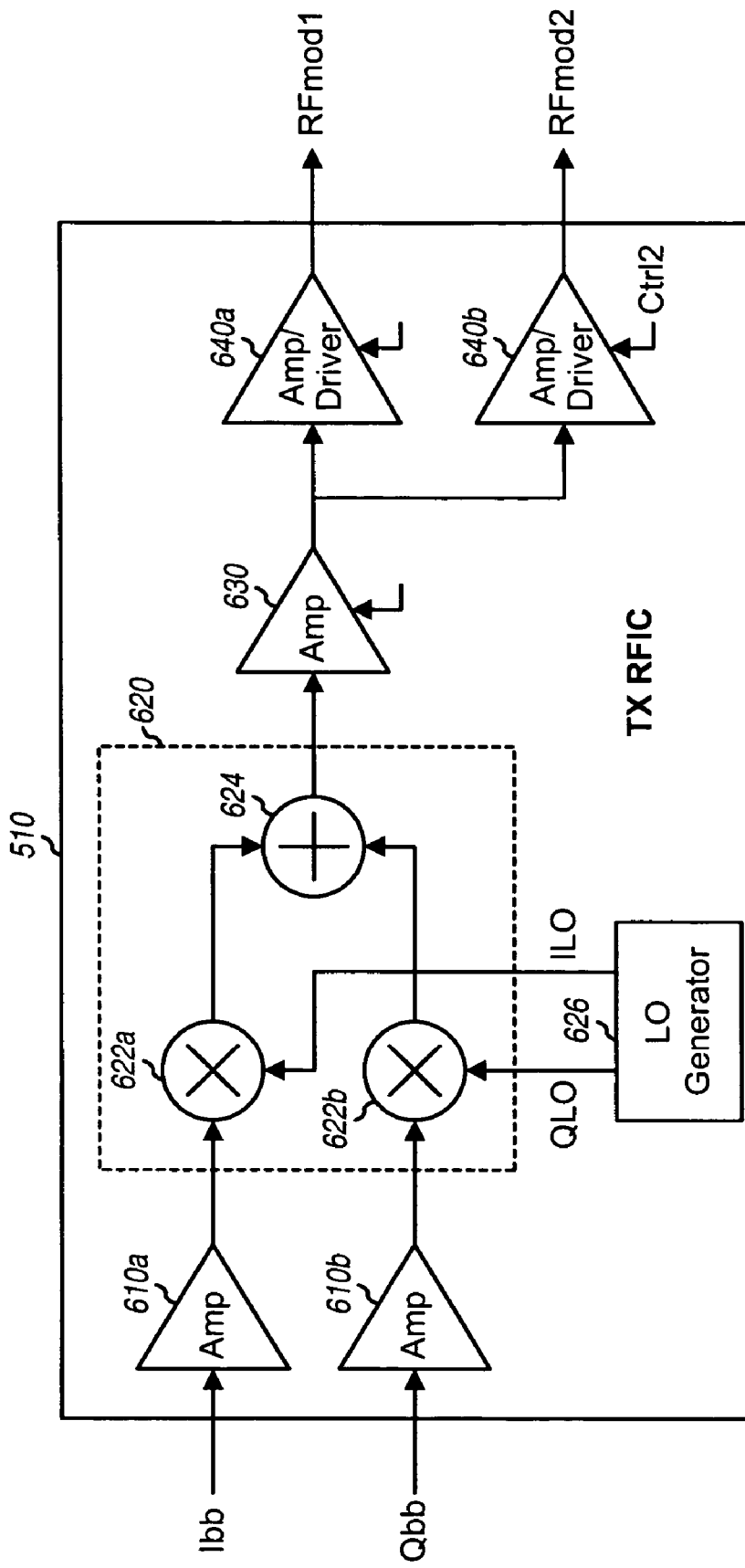
FIG. 6 shows a transmit RF integrated circuit (TX RFIC) within the transmitter unit in FIG. 5.

FIG. 6 shows a block diagram of an embodiment of TX RFIC 510 within transmitter unit 220c. For quadrature modulation, which is commonly used for many wireless communication systems, the baseband signals include an inphase (Ibb) baseband signal and a quadrature (Qbb) baseband signal. Within TX RFIC 510, amplifiers (Amp) 610a and 610b receive and amplify the Ibb and Qbb baseband signals, respectively, and provide amplified baseband signals to a quadrature modulator 620. Within modulator 620, a mixer 622a frequency upconverts its amplified baseband signal with an inphase local oscillator (ILO) signal from an LO generator 626 and provides an inphase modulated component. Similarly, a mixer 622b frequency upconverts its amplified baseband signal with a quadrature local oscillator (QLO) signal from LO generator 626 and provides a quadrature modulated component. A summer 624 sums the inphase and quadrature modulated components and provides a modulated signal. The modulated signal is amplified by an amplifier 630 and further amplified by both amplifiers/drivers 640a and 640b to generate the first RF modulated signal (RFmod1) and the second RF modulated signal (RFmod2), respectively.

FIG. 6 shows a specific transmitter design. In general, the conditioning of the signal in each transmit signal path may be performed by one or more stages of amplifier, filter, mixer, and so on. These circuit blocks may be arranged in a manner different from that shown in FIG. 6. Furthermore, other circuit blocks not shown in FIG. 6 may also be used to condition the signal in each transmit signal path. FIG. 6 also shows a direct upconversion architecture, which performs modulation directly at RF to generate the RF modulated signal. For a super-heterodyne architecture (not shown in FIG. 6), the modulation is performed at an intermediate frequency (IF) instead of RF to generate an IF modulated signal, which is then frequency upconverted to RF.

Amplifier/driver 640a is part of the main transmit signal path, and amplifier/driver 640b is part of the diversity transmit signal path. The Ctrl2 signal is provided to amplifier/driver 640b and used to control the operation of amplifier/driver 640b and hence the diversity transmit signal path. The main transmit signal path may be controlled by the Ctrl1 signal that is applied to power amplifier 518 in the main transmit signal path, as shown in FIG. 5.

For the embodiments shown in FIGS. 3 through 6, the second RF output signal level may be set smaller than the first RF output signal level (i.e., Pout 2<Pout 1). This allows for a simpler design and lower cost for the diversity transmit signal path, which does not need to handle a high RF output signal level. For example, smaller power amplifiers 318b and 418b may be used for the diversity transmit signal paths in FIGS. 3 and 4, respectively, external power amplifier may be omitted for the diversity transmit signal path in FIG. 5, and the RF signals for both transmit signal paths may be generated by a single RFIC in FIG. 6.

For some of the embodiments described above, enabling and disabling the diversity transmit signal path may be much simpler to implement than adjusting the gain and/or phase of the signal path. The diversity transmit signal path can often be disabled by simply removing the bias current to a power amplifier or a driver in the signal path.

Figure 7:
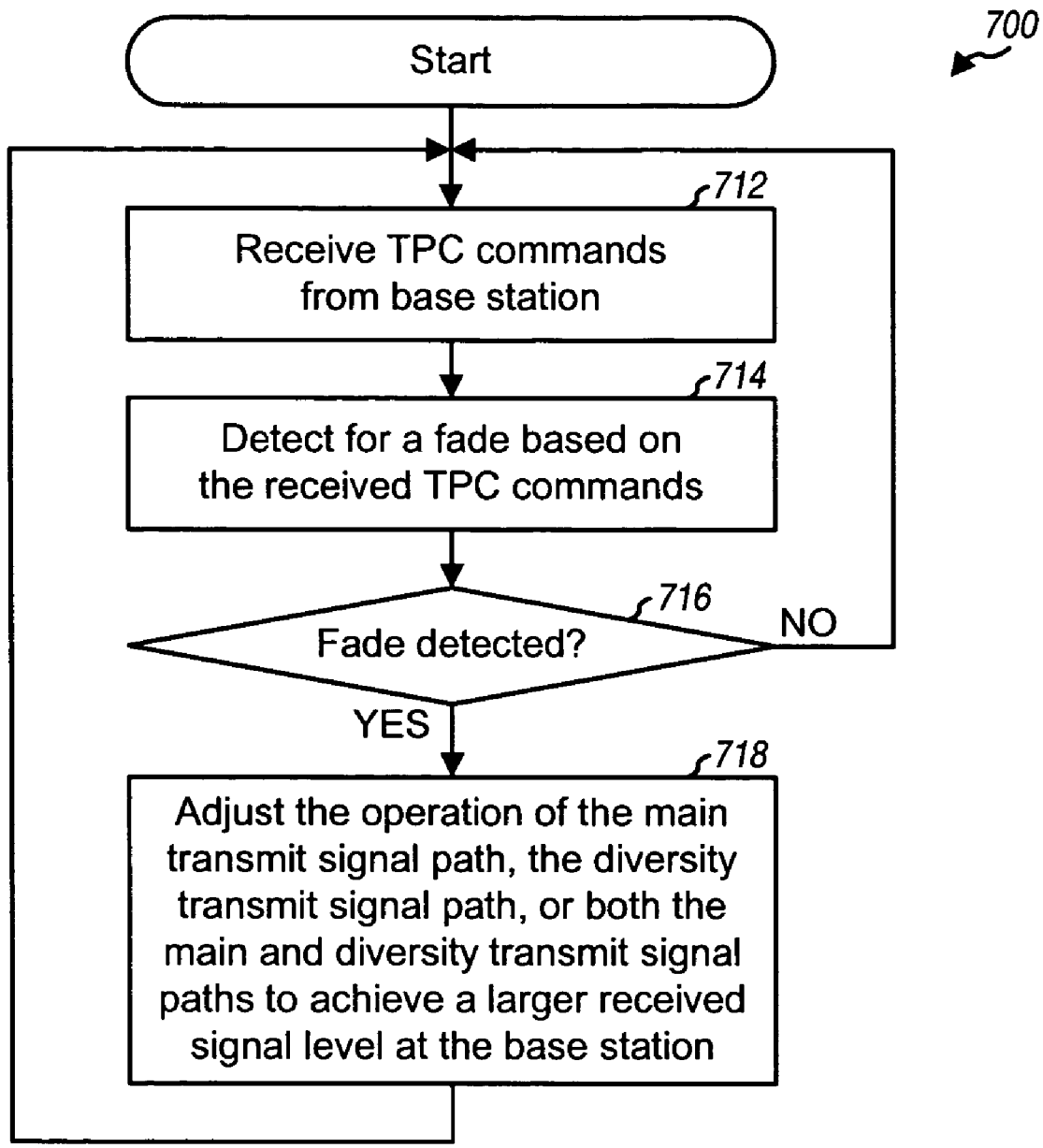
FIG. 7 shows a process to control the operation of multiple transmit signal paths.

FIG. 7 shows a process 700 to control the operation of the multiple transmit signal paths based on received TPC commands. Process 700 may be used with transmitter unit 220a in FIG. 3, transmitter unit 220b in FIG. 4, and transmitter unit 220c in FIG. 5. Process 700 may be performed by controller 240 in FIG. 2.

The wireless device receives TPC commands from the base station (block 712) and detects for a fade based on the received TPC commands, as described above (block 714). If a fade is detected, as determined in block 716, then the wireless device adjusts the operation of the main transmit signal path, the diversity transmit signal path, or both the main and diversity transmit signal paths to achieve a larger received signal level at the base station (block 718). The wireless device may implement any of the adjustment embodiments and schemes described above for FIGS. 3 through 5. After block 718 and also if a fade is not detected in block 716, the wireless device returns to block 712. The wireless device may perform blocks 714 through 718 in each time interval, which may be of any duration.

The operation of the main and diversity transmit signal paths in the manner described above can improve the received signal level at the base station by taking advantage of scattering in the wireless environment. The higher received signal level allows the wireless device to achieve the target SNR using less transmit power on average. This may, in turn, substantially reduce power consumption by the wireless device, which may then extend talk time.

For clarity, control of the transmit signal paths based on TPC commands has been described above. The TPC commands are sent at a relatively high rate (e.g., 400, 800, or 1600 times per second) in some wireless systems and allow for fast adjustment of the transmit signal paths to combat a fast fade. The transmit signal paths may also be controlled based on other types of feedback that may be available at the wireless device. For example, the transmit signal paths may be controlled based on acknowledgments (ACKs) and/or negative acknowledgments (NAKs) received by the wireless device for an incremental redundancy (IR) transmission scheme, such as a hybrid acknowledgment/request (H-ARQ) transmission scheme commonly used in CDMA. The transmit signal paths may also be adjusted based on a received signal strength indicator (RSSI) measured at the base station and sent back to the wireless device.

Also for clarity, much of the description above is for a wireless device having two antennas and two transmit signal paths. In general, the techniques described herein may be used for a wireless device equipped with any number of antennas greater than one. A wireless device with more than two antennas may enable the main transmit signal path whenever transmitting and autonomously adjust any one or any combination of the remaining transmit signal paths. The wireless device may also selectively enable and disable different individual transmit signal paths or different combinations of transmit signal paths based on the received TPC commands or some other feedback.

The wireless device described herein may be used in various wireless communication systems such as CDMA systems, Time Division Multiple Access (TDMA) systems, Frequency Division Multiple Access (FDMA) systems, Global System for Mobile Communications (GSM) systems, and so on. CDMA systems may implement various radio access technologies (RATs) such as cdma2000, Wideband-CDMA (W-CDMA), and so on. The wireless device may also support operation on multiple systems (e.g., CDMA and GSM systems).

The processing and transmitter units for the wireless device may be implemented by various means. For example, the transmitter unit may be implemented on one or more RFICs and/or with discrete circuit components. The unit that controls the operation of the transmit signal paths (autonomously or based on feedback) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The control function may also be implemented with software modules (e.g., procedures, functions, and so on) that perform the functions described herein. The software codes may be stored in a memory unit (e.g., memory unit 242 in FIG. 2) and executed by a processor (e.g., controller 240). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless device comprising:
a first transmit signal path operable to generate a first radio frequency (RF) output signal for transmission from a first antenna;
a second transmit signal path operable to generate a second RF output signal for transmission from a second antenna, the first and second antennas being transmit antennas and being de-correlated with respect to each other; and
a controller operable to selectively enable the first transmit signal path, the second transmit signal path, or both the first and second transmit signal paths to achieve a higher received signal level at a receiver, wherein the first and second transmit signal paths are selectively disabled based on transmit power control (TPC) commands received by the wireless device.

2. The wireless device of claim 1, wherein the controller is operable to enable the first transmit signal path at all times and to selectively enable and disable the second transmit signal path.

3. The wireless device of claim 1, wherein the controller is operable to selectively enable and disable the first transmit signal path, the second transmit signal path, or both the first and second transmit signal paths based on the transmit power control (TPC) commands received by the wireless device.

4. The wireless device of claim 3, wherein the controller is operable to select different configurations of the first and second transmit signal paths based on the received TPC commands, each configuration corresponding to a different set of at least one transmit signal path that is enabled.

5. The wireless device of claim 3, wherein the controller is operable to detect for a fade based on the received TPC commands and to select a different configuration of the first and second transmit signal paths whenever a fade is detected.

6. The wireless device of claim 5, wherein the controller detects a fade if a predetermined number of consecutive UP commands is received by the wireless device, each UP command being a TPC command to increase transmit power.

7. The wireless device of claim 5, wherein the controller detects a fade if a predetermined percentage, or higher, of TPC commands received by the wireless device within a time window is UP commands, each UP command being a TPC command to increase transmit power.

8. The wireless device of claim 1, wherein the first and second antennas are of different types.

9. The wireless device of claim 8, wherein the first antenna is a dipole antenna and the second antenna is a patch antenna.

10. The wireless device of claim 1, wherein the first transmit signal path is operable to provide a first output signal level and the second transmit signal path is operable to provide a second output signal level that is lower than the first output signal level.

11. A method of transmitting data, comprising:
generating a first radio frequency (RF) output signal for transmission from a first antenna at a wireless device;
generating a second RF output signal for transmission from a second antenna, the first and second antennas being transmit antennas and being de-correlated with respect to each other;
selectively enabling the generation of the first RF output signal, the second RF output signal, or both the first and second RF output signals to achieve a higher received signal level at a receiver, wherein the first and second RF output signals are selectively disabled based on transmit power control (TPC) commands received by the wireless device.

12. The method of claim 11, further comprising:
receiving the transmit power control (TPC) commands at the wireless device, and wherein the generation of the first RF output signal, the second RF output signal, or both the first and second RF output signals is selectively enabled based on the received TPC commands.

13. The method of claim 12, further comprising:
detecting for a fade based on the received TPC commands, and wherein a different set of at least one RF output signal is generated if the fade is detected.

14. A wireless apparatus, comprising:
means for generating a first radio frequency (RF) output signal for transmission from a first antenna;
means for generating a second RF output signal for transmission from a second antenna, the first and second antennas being transmit antennas and being de-correlated with respect to each other; and
means for selectively enabling the means for generating the first RF output signal, the means for generating the second RF output signal, or both the means for generating the first RF output signal and the means for generating the second RF output signal to achieve a higher received signal level at a receiver, wherein the first and second RF output signals are selectively disabled based on transmit power control (TPC) commands received by the wireless device.

15. A wireless device comprising:
a first transmit signal path operable to generate a first radio frequency (RF) output signal for transmission from a first antenna;
a second transmit signal path operable to generate a second RF output signal for transmission from a second antenna, the first and second antennas being transmit antennas and being de-correlated with respect to each other; and a controller operable to autonomously adjust operation of the first transmit signal path, the second transmit signal path, or both the first and second transmit signal paths without feedback from a receiver receiving the first and second RF output signals, wherein the first and second transmit signal paths are selectively disabled based on transmit power control (TPC) commands received by the wireless device.

16. The wireless device of claim 15, wherein the second transmit signal path is operable to vary amplitude of the second RF output signal over time.

17. The wireless device of claim 15, wherein the second transmit signal path is operable to vary phase of the second RF output signal over time.

18. The wireless device of claim 15, wherein the controller is operable to alternately enable and disable the second transmit signal path over time.

19. The wireless device of claim 15, wherein the controller is operable to select different configurations of the first and second transmit signal paths over time.

20. The wireless device of claim 15, wherein the first and second antennas are of different types.

21. A wireless device comprising:
a first transmit signal path operable to generate a first radio frequency (RF) output signal;
a second transmit signal path operable to generate a second RF output signal;
a first antenna for transmitting the first RF output signal; and
a second antenna for transmitting the second RF output signal, the first and second antennas being transmit antennas and being de-correlated with respect to each other, wherein the first and second transmit signal paths are selectively disabled based on transmit power control (TPC) commands received by the wireless device.

22. The wireless device of claim 21, wherein the first antenna is a dipole antenna.

23. The wireless device of claim 21, wherein the second antenna is a patch antenna.

24. The wireless device of claim 21, wherein the first and second antennas have different polarizations.

25. The wireless device of claim 21, wherein the second transmit signal path is selectively enabled and disabled.

26. The wireless device of claim 25, wherein the second transmit signal path is selectively enabled and disabled based on the transmit power control (TPC) commands received by the wireless device.

27. The wireless device of claim 21, wherein the second transmit signal path comprises at least one circuit element operable to adjust phase, amplitude, or both amplitude and phase of the second RF output signal.

28. A wireless device comprising:
a first transmit signal path operable to generate a first radio frequency (RF) output signal having a first power level;
a second transmit signal path operable to generate a second RF output signal having a second power level that is lower than the first power level;
a first antenna for transmitting the first RF output signal; and
a second antenna for transmitting the second RF output signal, the first and second antennas being transmit antennas and being de-correlated with respect to each other, wherein the first and second transmit signal paths are selectively disabled based on transmit power control (TPC) commands received by the wireless device.

29. The wireless device of claim 28, further comprising:
an integrated circuit operable to receive baseband signals and generate a first RF modulated signal for the first transmit signal path and the second RF output signal for the second transmit signal path, the first RF modulated signal being further processed by the first transmit signal path to generate the first RF output signal.

30. The wireless device of claim 28, wherein the second RF output signal is at least three decibels (dB) lower than the first RF output signal.

31. The wireless device of claim 28, wherein the first and second antennas are of different types.

32. The wireless device of claim 28, wherein the second transmit signal path is selectively enabled and disabled.

33. An integrated circuit for a wireless device, comprising:
a modulator operable to receive baseband signals and generate a modulated signal;
a first amplifier operable to amplify the modulated signal and provide a first radio frequency (RF) modulated signal; and
a second amplifier operable to amplify the modulated signal and provide a second RF modulated signal, wherein the first and second RF modulated signals are designated for respective transmission from first and second antennas de-correlated with respect to each other, and wherein operation of the first amplifier, the second amplifier, or both the first and second amplifiers is controlled to achieve a higher received signal level at a receiver, wherein the first and second RF modulated signals are selectively disabled based on transmit power control (TPC) commands received by the wireless device.

34. The apparatus of claim 33, wherein the first amplifier, the second amplifier, or both the first and second amplifiers are selectively enabled and disabled based on the transmit power control (TPC) commands received by the wireless device from the receiver.

35. The apparatus of claim 33, wherein the second amplifier is selectively enabled and disabled autonomously without feedback from the receiver.

36. The apparatus of claim 33, wherein the first and second amplifiers are each controlled by varying gain, phase, or both gain and phase of the amplifier.

* * * * *

UNITED STATES PATENT AND TRADEMARK OFFICE
CERTIFICATE OF CORRECTION

PATENT NO. : 7,660,598 B2
APPLICATION NO. : 11/020054
DATED : February 9, 2010
INVENTOR(S) : Barnett et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 886 days.

Signed and Sealed this

Fourth Day of January, 2011

David J. Kappos
*Director of the United States Patent and Trademark Office*